(12) United States Patent
Huber et al.

(10) Patent No.: US 11,565,727 B2
(45) Date of Patent: Jan. 31, 2023

(54) DRIVE ASSEMBLY FOR A RAIL VEHICLE

(71) Applicant: Süddeutsche Gelenkscheibenfabrik GmbH & Co. KG, Waldkraiburg (DE)

(72) Inventors: Armin Huber, Schönberg (DE); Martin Ebenhofer, Reut (DE); Wolfgang Orthofer, Jr., Mühldorf am Inn (DE)

(73) Assignee: SÜDDEUTSCHE GELENKSCHEIBENFABRIK GMBH & CO. KG, Waldkraiburg (DE)

( * ) Notice: Subject to any disclaimer, the term of this patent is extended or adjusted under 35 U.S.C. 154(b) by 436 days.

(21) Appl. No.: 16/716,646

(22) Filed: Dec. 17, 2019

(65) Prior Publication Data

US 2020/0198663 A1    Jun. 25, 2020

(30) Foreign Application Priority Data

Dec. 19, 2018 (DE) .......................... 102018009993.9

(51) Int. Cl.
*B61C 9/50* (2006.01)
*H02K 7/00* (2006.01)
*B61C 3/00* (2006.01)

(52) U.S. Cl.
CPC ................ *B61C 9/50* (2013.01); *B61C 3/00* (2013.01); *H02K 7/003* (2013.01)

(58) Field of Classification Search
CPC .... B61C 3/00; B61C 9/38; B61C 9/48; B61C 9/50; B61F 3/00; B61F 3/02; B61F 3/04; H02K 7/003
See application file for complete search history.

(56) References Cited

FOREIGN PATENT DOCUMENTS

| | | | |
|---|---|---|---|
| CN | 105813916 A | * 7/2016 | ............ B61C 17/00 |
| DE | 642676 C | 3/1937 | |
| DE | 19633944 A1 | 3/1998 | |
| DE | 19831265 A1 | 1/2000 | |
| DE | 102017102138 A1 | * 8/2018 | ................ B61F 3/04 |
| DE | 102017003275 A1 | * 10/2018 | |
| EP | 1477380 A1 | 11/2004 | |
| EP | 2883774 A1 | 6/2015 | |
| WO | 2006051046 A1 | 5/2006 | |

OTHER PUBLICATIONS

Search Report issued in German Patent Application No. 102018009993.9, dated Aug. 2, 2019.

* cited by examiner

*Primary Examiner* — Robert J McCarry, Jr.
(74) *Attorney, Agent, or Firm* — Moore & Van Allen PLLC; Henry B. Ward, III (57) ABSTRACT

A drive assembly is provided for a rail vehicle, having at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel.

20 Claims, 9 Drawing Sheets

DRIVE ASSEMBLY FOR A RAIL VEHICLE

FIELD AND BACKGROUND OF THE INVENTION

The present invention relates to a drive assembly for a rail vehicle. The present invention also relates to a wheel set and to a bogie having such a drive assembly. Traction motors of rail vehicles are frequently used in combination with a transmission. The purpose of the transmission is to adapt the speed level of the motors to the speed level of the wheel set and of the wheels since electric motors are usually operated at higher speeds than the wheels. Advances in the field of electric motors and inverters make it possible to use motors without transmissions. These advances permit electric motors to operate at lower speeds.

BRIEF SUMMARY OF THE INVENTION

One object of the present invention is to provide a drive assembly for a rail vehicle of the type mentioned at the beginning which enables a direct coupling between the motor and a wheel set or a rail vehicle wheel by compensating for relative movements between the motor and the wheel set or between the motor and the rail vehicle wheel.

This object is attained with a drive assembly having the features of at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel. In one embodiment, the at least one elastic coupling of the drive assembly is coupled to the wheel set shaft and a motor output element of the at least one motor. In another embodiment, the wheel set shaft of the drive assembly extends through the motor and the at least one elastic coupling. In another embodiment, the at least one elastic coupling is coupled directly to the at least one rail vehicle wheel and a motor output element of the at least one motor. In another embodiment, the at least one elastic coupling has at least one flange that is coupled directly to the wheel set shaft or the at least one rail vehicle wheel. In another embodiment, the at least one elastic coupling has at least one other flange that is coupled directly to the motor output element. In another embodiment, the at least one elastic device is coupled directly to the at least one motor output element. In another embodiment, the at least one elastic coupling has at least two elastic devices that are connected to each other by means of an intermediate piece. In another embodiment, the at least one intermediate piece extends through the at least one motor. In another embodiment, the at least one elastic coupling has at least one connecting element that extends at least partway through the at least one rail vehicle wheel; the at least one connecting element is coupled to the motor; and the at least one elastic device is coupled to the at least one rail vehicle wheel. In another embodiment, the at least one elastic device has at least one fiber-reinforced articulating device or at least one elastic coupling wedge packet. In another embodiment, the at least one fiber-reinforced articulating device has at least one elastic disc joint or at least one elastic coupling loop. In another embodiment, a wheel set is provided having at least one drive assembly comprising at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel. In another embodiment, a bogie is provided having at least one drive assembly comprising at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel. In yet another embodiment, the at least one motor is supported on the bogie by at least one support. In still another embodiment, a rail vehicle is provided, wherein the rail vehicle has at least one drive assembly comprising at least one selected from the group comprising (1) at least one drive assembly comprising at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel; (2) at least one wheel set comprising at least one drive assembly comprising at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel; and (3) at least one bogie having at least one drive assembly comprising at least one motor, at least one wheel set shaft or at least one rail vehicle wheel, and at least one elastic coupling that has at least one elastic device, wherein the at least one elastic coupling is embodied to couple the at least one motor directly to the wheel set shaft or directly to the at least one rail vehicle wheel.

The drive assembly for a rail vehicle comprises at least one motor, at least one wheel set shaft or at least one rail vehicle wheel, and at least one elastic coupling.

The at least one elastic coupling is embodied to couple the at least one motor directly to the wheel set shaft or directly to the at least one rail vehicle wheel.

With the at least one elastic coupling, it is possible to compensate for relative movements between the at least one motor and the wheel set shaft or the at least one rail vehicle wheel. The motor can be positioned coaxial to the wheel set shaft. In addition, the axis of rotation of the at least one rail vehicle wheel can be positioned coaxial to the motor. With the drive assembly according to the invention, a wheel set or a rail vehicle wheel can be driven directly by the motor without a transmission having to be provided. But according to the invention, it is nevertheless possible to compensate for relative movements between the motor and the wheel set or rail vehicle wheel by means of the at least one elastic coupling. The invention therefore constitutes a direct drive without a gear box, in which direct drive relative movements between the motor and the wheel set or relative movements between the motor and the at least one rail vehicle wheel can be compensated for by means of the at least one elastic coupling. The drive assembly according to the invention is thus embodied for directly driving a wheel set of a rail vehicle or a rail vehicle wheel.

The at least one elastic coupling can be coupled to the wheel set shaft and a motor output element of the at least one motor. The wheel set shaft, the motor output element, and the at least one coupling can be positioned coaxially. The at least one elastic coupling can be coupled directly to the motor output element and the wheel set shaft. The at least one coupling can thus be connected firmly or in a rotationally coupled fashion to both the wheel set shaft and the motor output element. The wheel set shaft can extend through the motor and the at least one coupling. The wheel set shaft can extend through an opening in the motor. The motor output element can be a motor output shaft, a motor output ring, or a motor output disc.

The at least one rail vehicle wheel can be supported in rotary fashion on a chassis of a rail vehicle. The motor and the at least one elastic coupling can be connected to the chassis. The at least one rail vehicle wheel can be positioned between the chassis and the motor with the elastic coupling. A plurality of rail vehicle wheels can be provided. Each rail vehicle wheel can be associated with a motor and an elastic coupling, which directly couples the motor to the respective rail vehicle wheel.

The at least one elastic coupling can be coupled to the at least one rail vehicle wheel and a motor output element of the at least one motor. The at least one elastic coupling can be coupled directly to the at least one rail vehicle wheel and the at least one motor output element.

The at least one elastic coupling can have at least one elastic device.

The at least one elastic coupling can have at least one flange. The at least one flange can be coupled directly to the wheel set shaft. The at least one flange can be can be press-fitted onto the wheel set shaft. The wheel set shaft can have a section with an enlarged cross-section onto which the flange can be press-fitted. The at least one flange can be coupled directly to the at least one rail vehicle wheel. For example, the at least one flange can be screw-connected to the at least one rail vehicle wheel.

The at least one elastic coupling can have at least one additional flange. The at least one additional flange can be coupled directly to the motor output element. For example, the at least one additional flange can be coupled to the motor output element by means of a set of teeth and/or a screw connection.

The at least one elastic device can be coupled to the at least one motor output element. For example, the at least one elastic device can be screw-connected to the at least one motor output element. The at least one elastic device can be connected to the at least one rail vehicle wheel. For example, the at least one elastic device can be screw-connected to the at least one rail vehicle wheel. Spacers can be provided between the rail vehicle wheel and the at least one elastic device.

The at least one elastic coupling can have at least two elastic devices. The at least two elastic devices can be connected to each other by means of at least one intermediate piece. The at least one intermediate piece can be embodied as tubular. The at least one intermediate piece can have a flange section at each of its two axial ends. The at least one intermediate piece can have a plurality of arms at its axial ends. The arms can extend outward in a radial direction. The elastic devices can be connected to the flange sections or arms of the intermediate piece. The at least one wheel set shaft can extend through the intermediate piece. The at least one intermediate piece can extend through the at least one motor. In this case as well, the wheel set shaft can extend through the intermediate piece and thus also through the motor. The motor, the intermediate piece, and the wheel set shaft can be positioned coaxially.

The elastic coupling can have at least one connecting element. The at least one connecting element can extend at least partway through the at least one rail vehicle wheel. The rail vehicle wheel can have at least one through opening for the connecting element. The at least one connecting element can be coupled to the motor output element. The at least one connecting element can be connected to the at least one elastic device. The at least one elastic device can be connected to the rail vehicle wheel. The elastic device can be positioned on the side of the rail vehicle wheel oriented away from the motor.

The at least one elastic device can have at least one fiber-reinforced articulating device or at least one elastic coupling wedge packet. The at least one fiber-reinforced articulating device can have at least one elastic disc joint or at least one elastic coupling loop. For example, the at least one elastic coupling can be a flexible disc-joint coupling, coupling having a plurality of coupling loops, or a wedge packet coupling.

An elastic disc joint can comprise a plurality of bushings, which are positioned in the circumference direction at predetermined angular positions relative to a central axis of the articulating device, a plurality of fiber packets with each fiber packet wrapping around two adjacent bushings, a support device positioned on at least one of the bushings to axially guide the plurality of fiber packets, and an elastic body in which the fiber packets, the support devices, and the bushings are at least partially embedded. The support device can have at least two collar elements, which are embodied separately from each other and can be attached to one of the bushings.

Furthermore, the at least one fiber-reinforced articulating device can have a plurality of elastic coupling loops. The coupling loops can be coupled to each other. The coupling loops can comprise at least one elastic body. At least one fiber packet and at least two bushings around which the at least one fiber packet is wrapped can be embedded into the at least one elastic body. The at least one fiber packet can be secured to the at least two bushings in the axial direction by means of collar elements.

The at least one fiber packet can consist of a fiber wound in a looped shape or of a plurality of individual fibers wound in a looped shape. For example, the at least one elastic body can be made of an elastomer, a thermoplastic elastomer, a polymer, a silicone, a plastic, or a rubber.

The present invention also relates to a bogie or a wheel set with at least one drive assembly of the above-described type. The at least one motor can be supported on the bogie by means of at least one support. The present invention also relates to a rail vehicle wheel having a drive assembly of the above-described type. The present invention also relates to a rail vehicle that has at least one bogie and/or at least one wheel set with at least one drive assembly. Such a wheel set can have wheels that are rotationally coupled to a wheel set shaft. Alternatively, such a wheel set can also be a loose wheel set in which individually drivable wheels are positioned on a wheel set shaft or axle bridge that does not rotate along with them.

BRIEF DESCRIPTION OF THE SEVERAL VIEWS OF THE DRAWING

Exemplary embodiments of the present invention will be described below with reference to the accompanying figures. In the drawings.

DETAILED DESCRIPTION OF THE INVENTION

Figure 1:
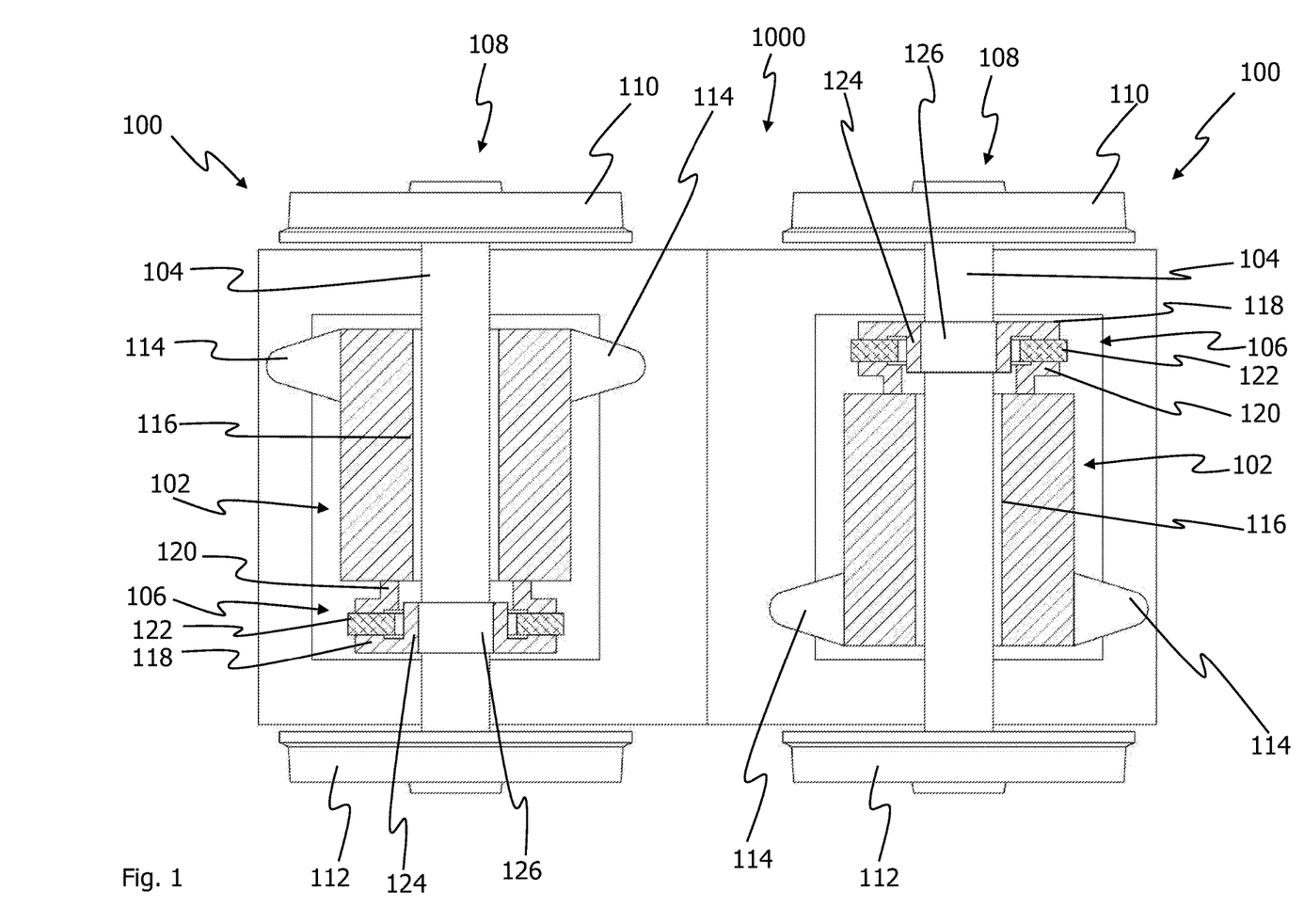
FIG. 1 shows a partial sectional view of a drive assembly according to a first embodiment.

FIG. 1 shows a partial sectional view of a bogie 1000 with two drive assemblies 100 according to a first embodiment. Each drive assembly 100 has a motor 102, a wheel set shaft 104, and an elastic coupling 106. The wheel set shaft 104 is part of a wheel set 108, which in addition to the wheel set shaft 104, also has the wheels 110 and 112. The wheel set 108 is supported on the bogie 1000. The motor 102 is supported on the bogie 1000 by means of supports 114. Aside from the two supports 114, according to this embodiment, the elastic coupling 106 also functions as a support for the motor 102. The motor 102 is supported in floating fashion by means of the supports 114. The coupling 106 constitutes a support for the motor 102 and is subject to a radial load due to the weight of the motor 102.

By means of the elastic coupling 106, the motor 102 is connected directly to the wheel set shaft 104, i.e. no transmission is provided. The drive assembly 100 thus constitutes a transmission less direct drive for the wheel set 108, i.e. a direct drive without a gear box. The motor 102 has an opening 116 through which the wheel set shaft 104 extends. The wheel set shaft 104 also extends through the coupling 106. The motor, the wheel set shaft 104, and the coupling 106 are positioned coaxially.

The elastic coupling 106 connects the motor 102 directly to the wheel set shaft 104. The elastic coupling 106 has a first flange 118, a second flange 120, and an elastic device 122 that connects the first flange to the second flange. The flange 118 has a hub-shaped section 124, which is connected to the wheel set shaft 104. The wheel set shaft 104 has a section 126 with an enlarged cross-section onto which the hub-shaped section 124 of the flange 118 is press-fitted. The flange 120 is connected to the motor 102 or to a motor output element that is not shown. A torque produced by the motor 102 can be transmitted directly to the wheel set shaft 104 via the coupling 106.

Figure 2:
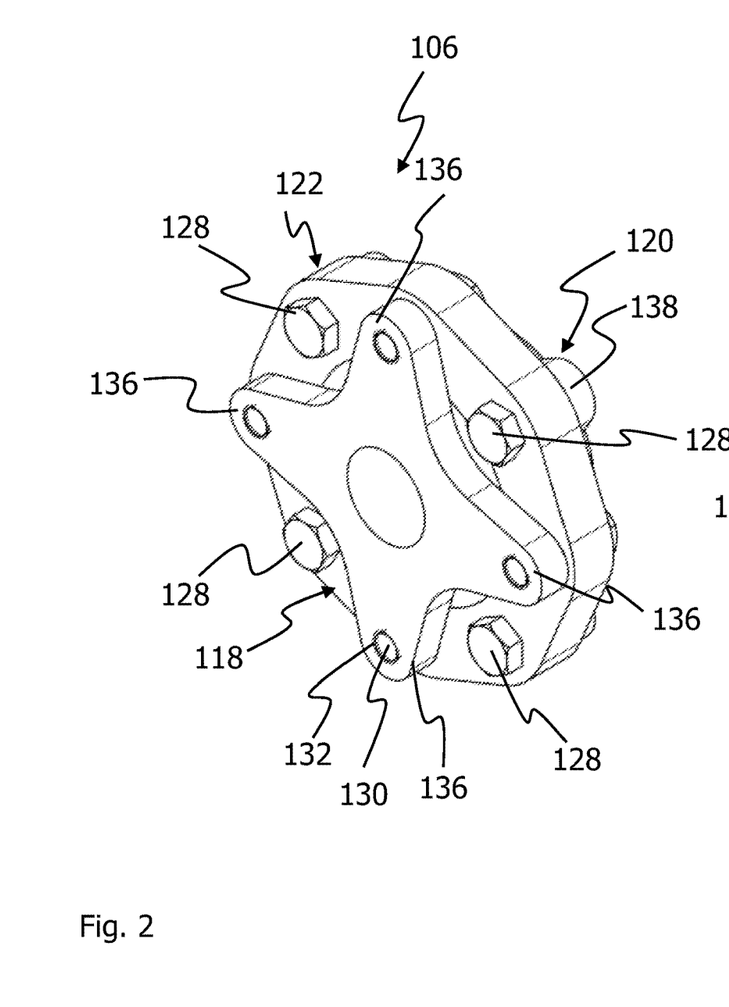
FIG. 2 shows views of an elastic coupling, which can be used in the drive assembly according to FIG. 1.
Figure 3:
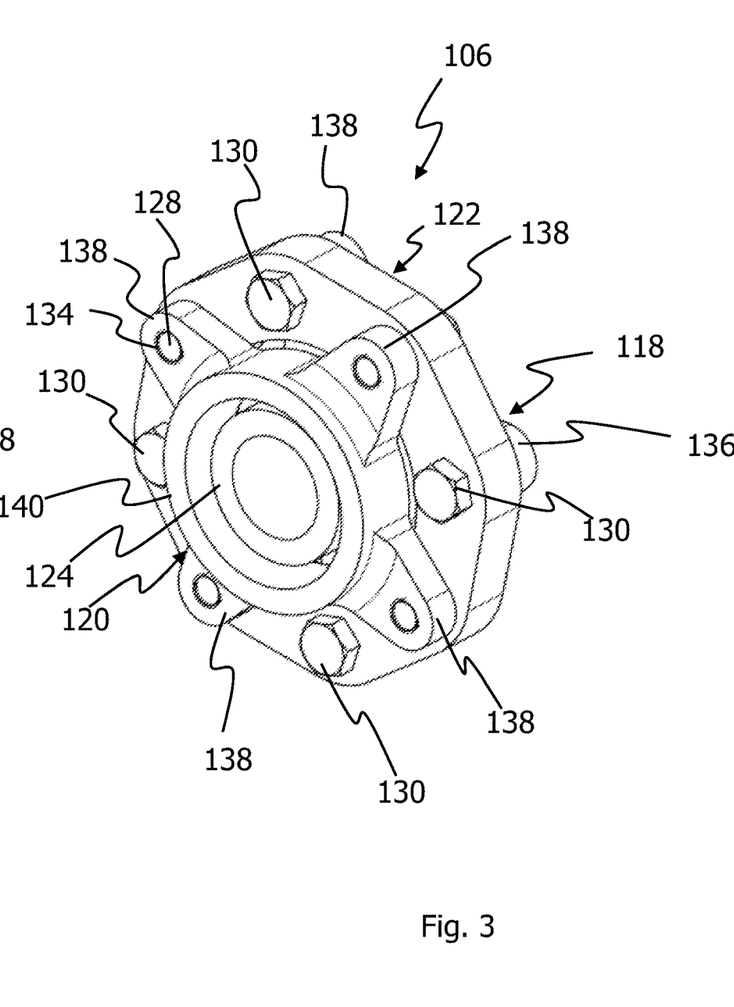
FIG. 3 shows views of an elastic coupling, which can be used in the drive assembly according to FIG. 1.

FIGS. 2 and 3 show perspective views of the elastic coupling 106, which can be used in the drive assembly 100 according to FIG. 1. The coupling 106 has the first flange 118, the second flange 120, and the elastic device 122, which connects the first flange 118 and the second flange 120 to each other. According to this embodiment, the elastic device 122 is an elastic disc joint. The elastic device 122 is screw-connected to the flanges 118, 120. For this purpose, screws 128, 130 extend in openings 132, 134 that are embodied in the flange arms 136, 138 of the flanges 118, 120. The first flange 118 has the hub-shaped section 124, which is visible inside the tubular section 140 of the second flange 120. By means of the tubular section 140, the second flange 120 can be connected to the motor output shaft (not shown) of the motor 102.

Figure 4:
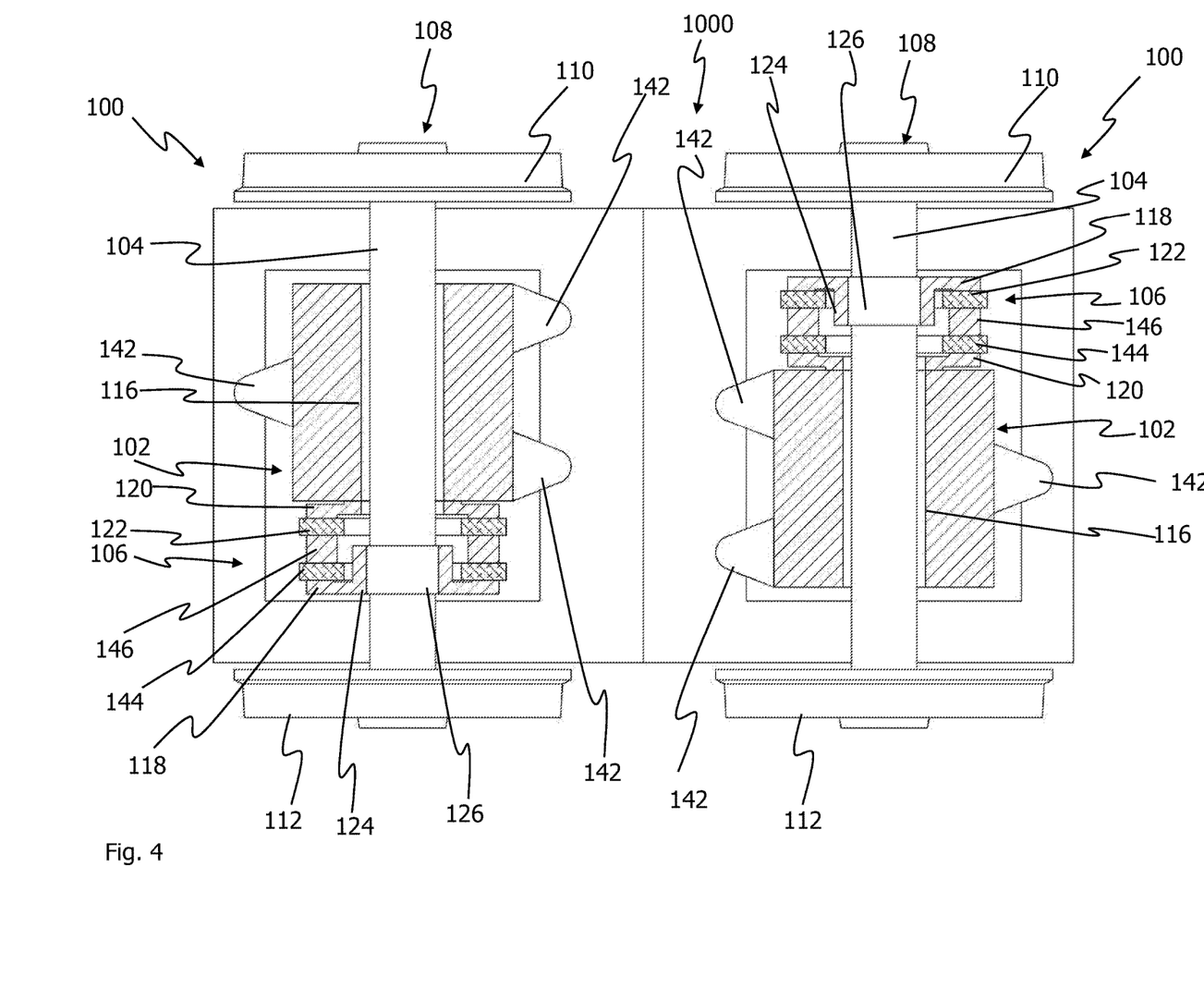
FIG. 4 shows a partial sectional view of a drive assembly according to a second embodiment.

FIG. 4 shows a partial sectional view of a bogie 1000, which has two drive assemblies 100 according to a second embodiment. The drive assembly 100 has the motor 102, the wheel set shaft 104, and the elastic coupling 106. The elastic coupling 106 couples the motor 102 directly to the wheel set shaft 104.

According to this embodiment, the motor 102 is connected to the bogie 1000 by means of three supports 142. The wheel set shaft 104 extends through the motor 102 and through the elastic coupling 106. The elastic coupling 106 is connected to the wheel set shaft 104 by means of the first flange 118. The first flange 118 has a hub-shaped section 124 that is press-fitted onto the section 126 of the wheel set shaft 104. The section 126 of the wheel set shaft 104 has an enlarged cross-section. In addition to the elastic device 122, the elastic coupling 106 has a second elastic device 144. The elastic devices 122 and 144 are connected to each other by means of a tubular intermediate piece 146. The motor 102, the wheel set shaft 104, and the elastic coupling 106 are positioned coaxially. The wheel set shaft 104 extends through the opening 116 of the motor 102 and through the elastic coupling 106.

Figure 5:
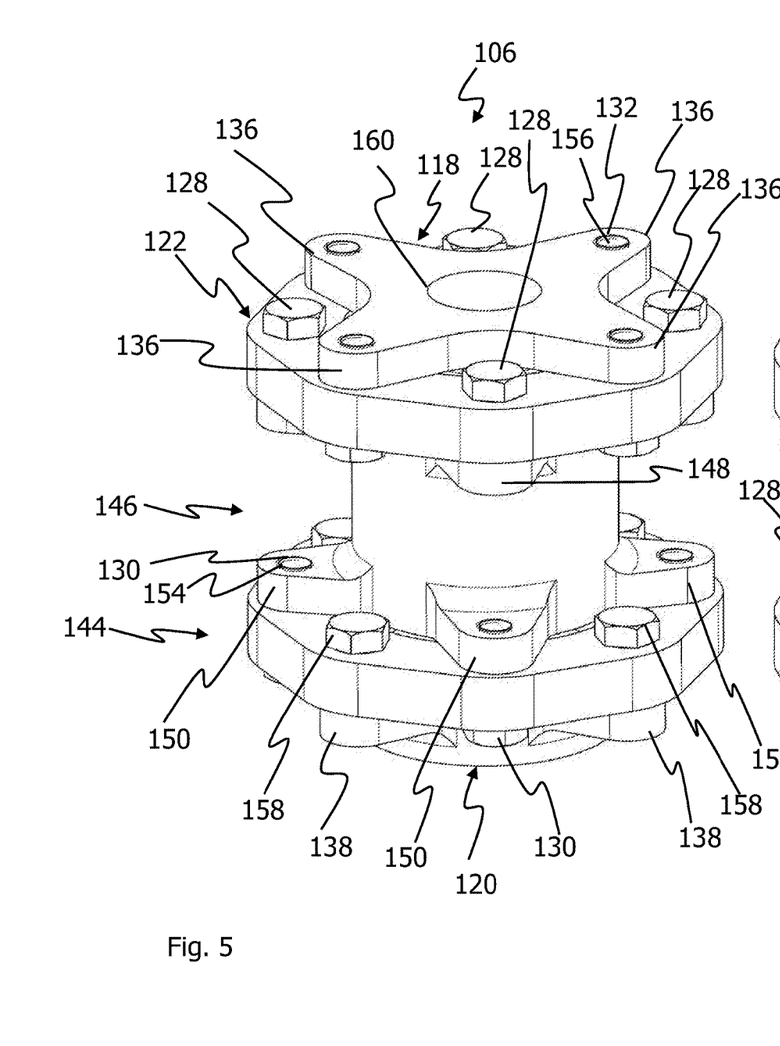
FIG. 5 shows views of an elastic coupling, which can be used in the drive assembly according to FIG. 4.
Figure 6:
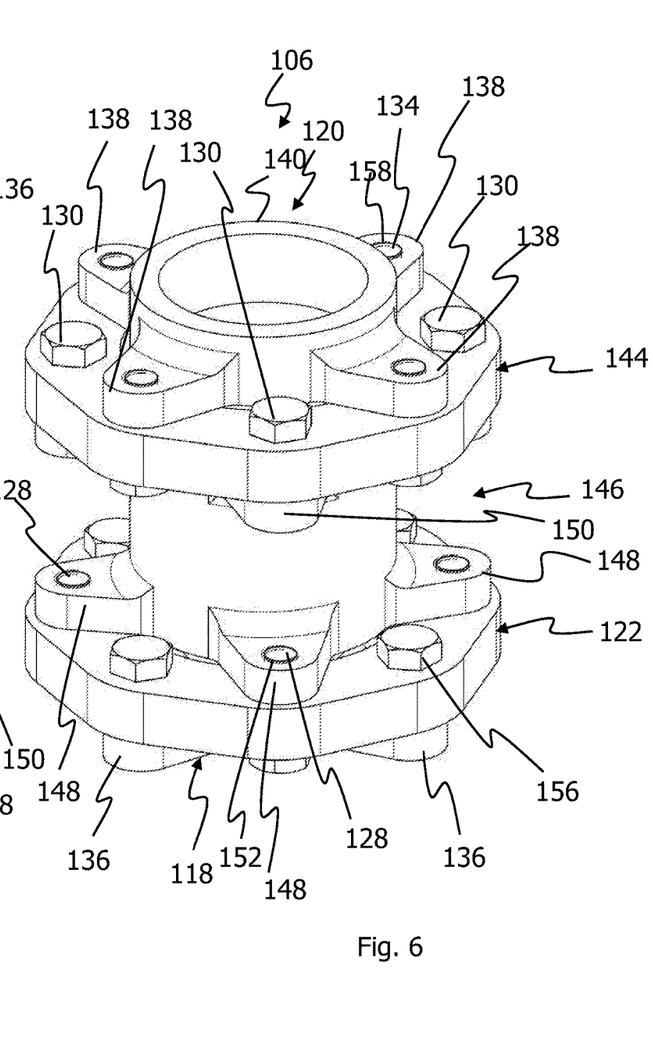
FIG. 6 shows views of an elastic coupling, which can be used in the drive assembly according to FIG. 4.

FIGS. 5 and 6 show perspective views of the elastic coupling 106, which can be used in the drive assembly 100 according to FIG. 4. The elastic coupling 106 has the first flange 118 and the second flange 120. The coupling 106 also has the two elastic devices 122 and 144, which are connected to each other by means of an intermediate piece 146. The flanges 118 and 120 are connected to each other by means of the two elastic devices 122 and 144 and the intermediate piece 146. The intermediate piece 146 is embodied as tubular. The intermediate piece 146 has arms 148 and 150 at its axial ends. The arms 148 and 150 each have an opening 152, 154 into which the screws 128, 130 for connecting the intermediate piece to one of the elastic devices 122, 144 are screwed. The flanges 118, 120 are screw-connected to the elastic devices 122, 144 by means of the screws 156, 158. FIG. 5 shows only the opening 160 of the hub-shaped section of the first flange 118.

Figure 7:
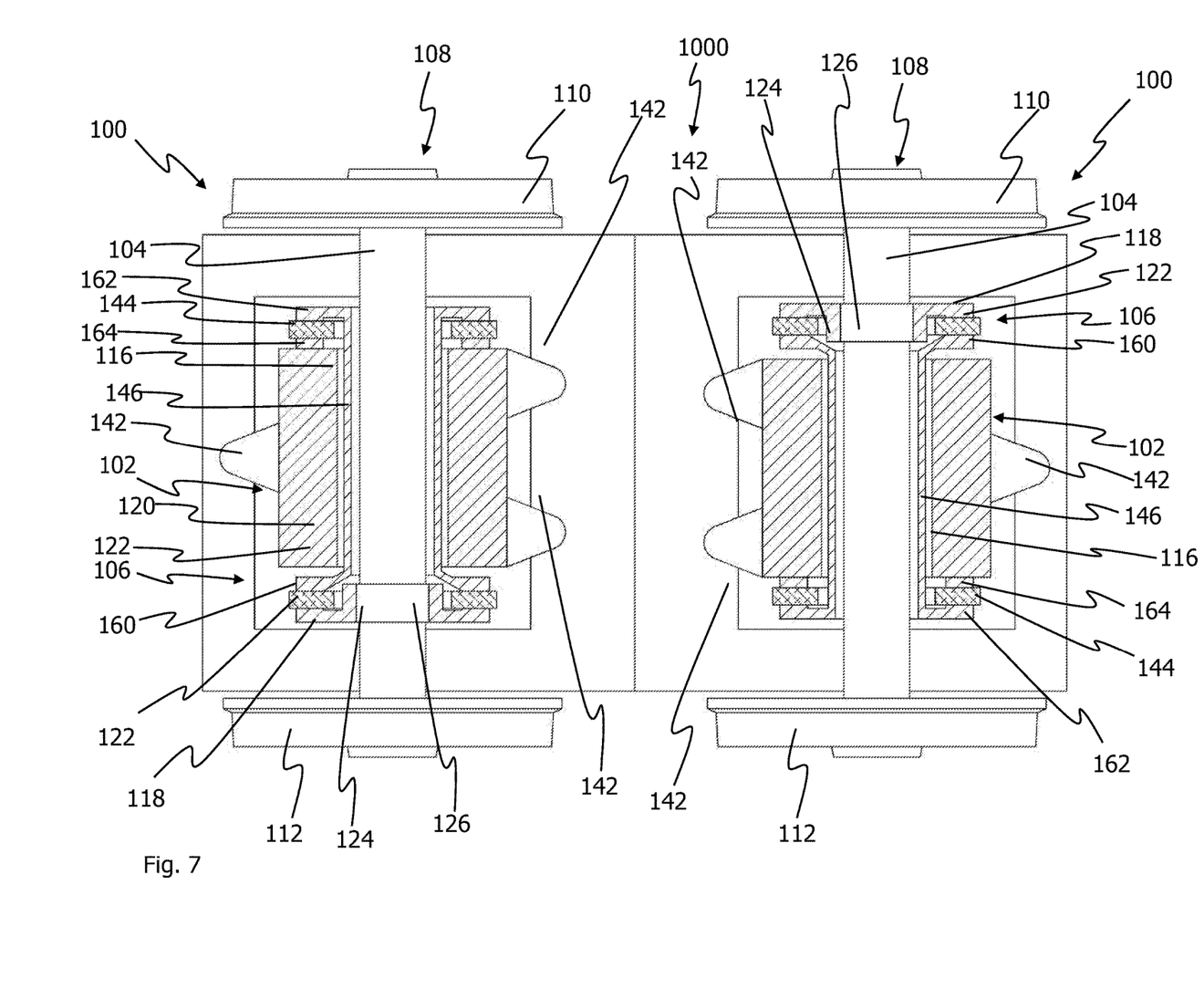
FIG. 7 shows a partial sectional view of a drive assembly according to a third embodiment.

FIG. 7 shows a partial sectional view of a bogie 1000, which has two drive assemblies 100 according to a third embodiment. The drive assembly 100 has the motor 102, the wheel set shaft 104, and the elastic coupling 106. The elastic coupling 106 couples the wheel set shaft 104 and the motor 102 to each other directly, i.e. no transmission is provided. The elastic coupling 106 has the first flange 118, which is press-fitted onto the section 126 of the wheel set shaft 124.

The section 126 of the wheel set shaft 124 has an enlarged cross-section. The elastic coupling 106 has two elastic devices 122 and 144 that are connected to each other by means of an intermediate piece 146. The intermediate piece 146 is embodied as tubular and has a flange section 160, 162 at each of its axial ends. The intermediate piece 146 extends through the elastic device 144 and is connected to this elastic device 144 by means of the flange section 162. The elastic device 144 is connected to a motor output element 164 and in this way, is coupled to the motor 102. The intermediate piece 146 extends through the opening 116 of the motor 102. The two elastic devices 122 and 144 are each positioned on a respective axial side surface of the motor 102. The flange sections 160 and 162 are also each positioned on a respective axial side surface of the motor 102. The first flange 118 is provided on the side of the motor 102 oriented away from the motor output element 164. The motor 102, the intermediate piece 146, and the wheel set shaft 104 are positioned coaxially.

Figure 8:
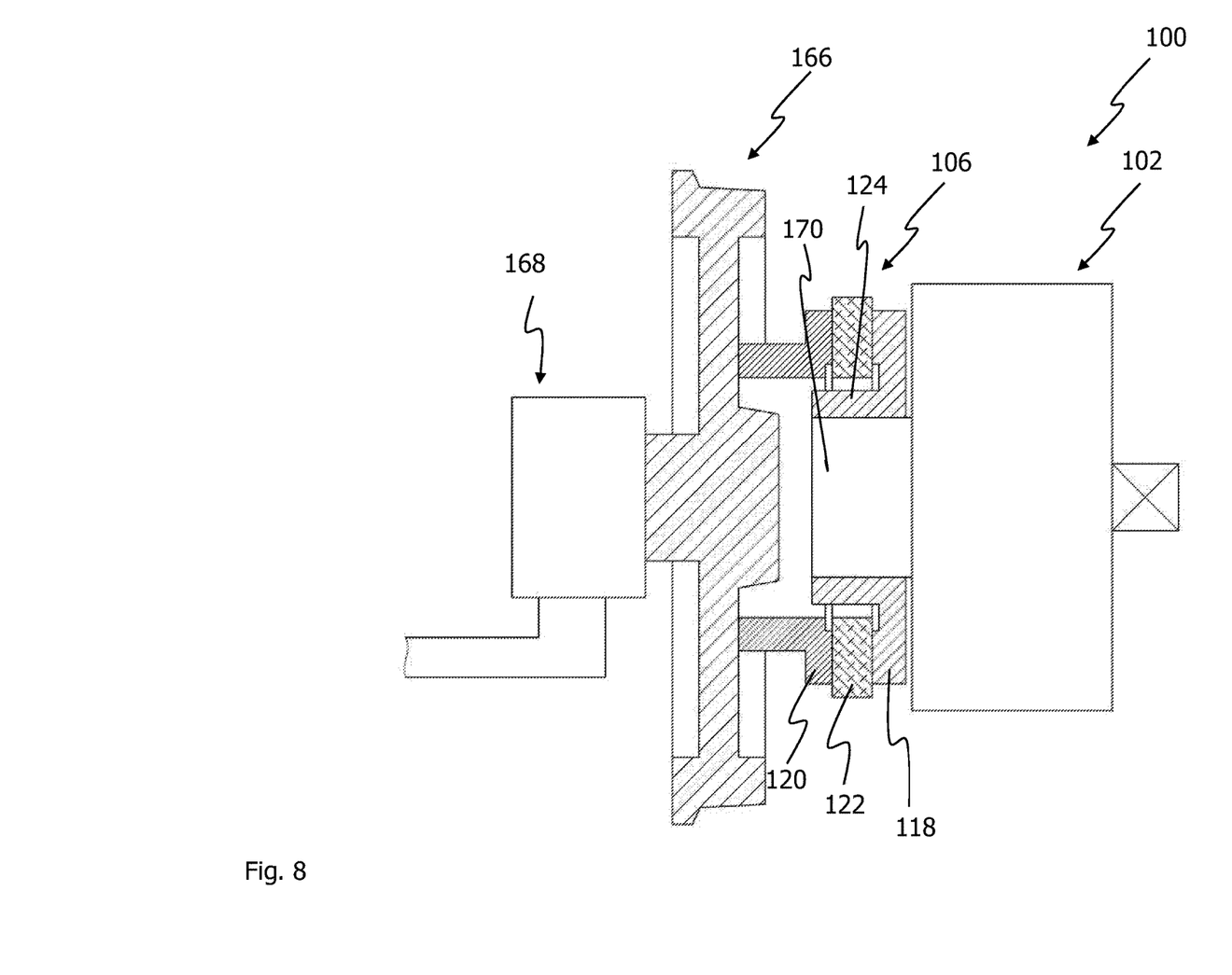
FIG. 8 shows a partial sectional view of a drive assembly according to a fourth embodiment.

FIG. 8 shows a partial sectional view of a drive assembly 100 according to a fourth embodiment. The drive assembly 100 has the motor 102, the elastic coupling 106, and a rail vehicle wheel 166. The rail vehicle wheel 166 is supported in rotary fashion on a chassis 168 of a rail vehicle. The elastic coupling 106 couples the rail vehicle wheel 166 to the motor 102 directly, i.e. no transmission is provided. The drive assembly 100 thus constitutes a direct drive for driving the rail vehicle 166.

The elastic coupling 106 has a first flange 118, a second flange 120, and an elastic device 122. The first flange 118 has a hub-shaped section 124, which is press-fitted onto a motor output shaft 170. The hub-shaped section 124 extends through an opening in the elastic device 122 and partway into the opening of the second flange 120. The second flange 120 is rotationally coupled to the rail vehicle wheel 166. The motor output shaft 170, the elastic coupling 106, and the rail vehicle wheel 166 are positioned coaxially.

Figure 9:
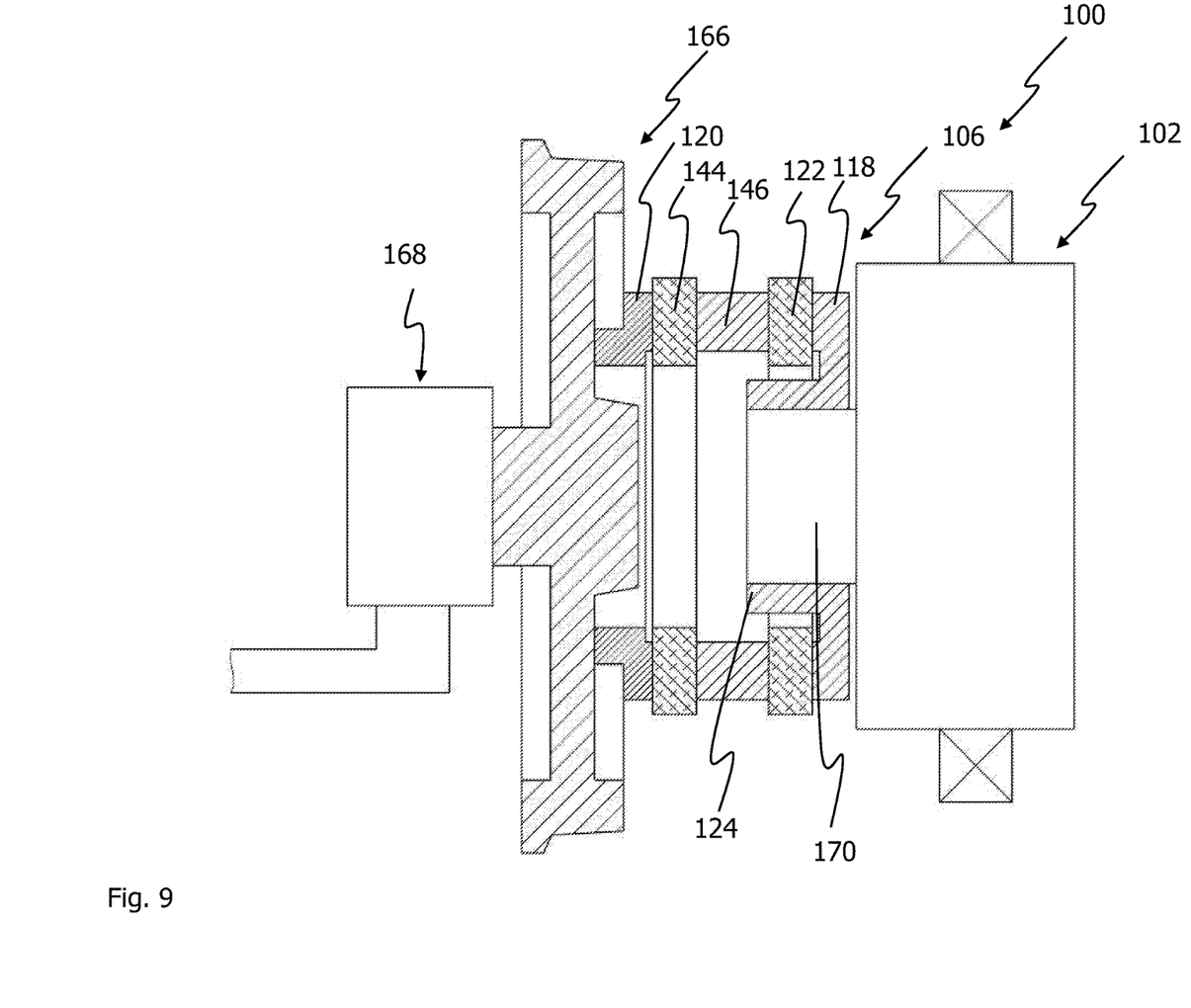
FIG. 9 shows a partial sectional view of a drive assembly according to a fifth embodiment.

FIG. 9 shows a partial sectional view of a drive assembly 100 according to a fifth embodiment. The drive assembly 100 has the motor 102, the elastic coupling 106, and the rail vehicle wheel 166. The elastic coupling 106 couples the motor 102 directly to the rail vehicle wheel 166. The elastic coupling 106 has the first flange 118 and the second flange 120. The first flange 118 and the second flange 120 are connected to each other by means of the elastic devices 122 and 144 and the tubular intermediate piece 146. The tubular intermediate piece 146 connects the two elastic devices 122 and 144 to each other. The elastic devices 122 and 144 can be embodied in the form of an elastic disc joint. The first flange 118 has a hub-shaped section 124 with which the first flange 118 is press-fitted onto the motor output shaft 170. The hub-shaped section 124 extends through an opening in the elastic device 122 and partway into the opening of the tubular intermediate piece 146.

Figure 10:
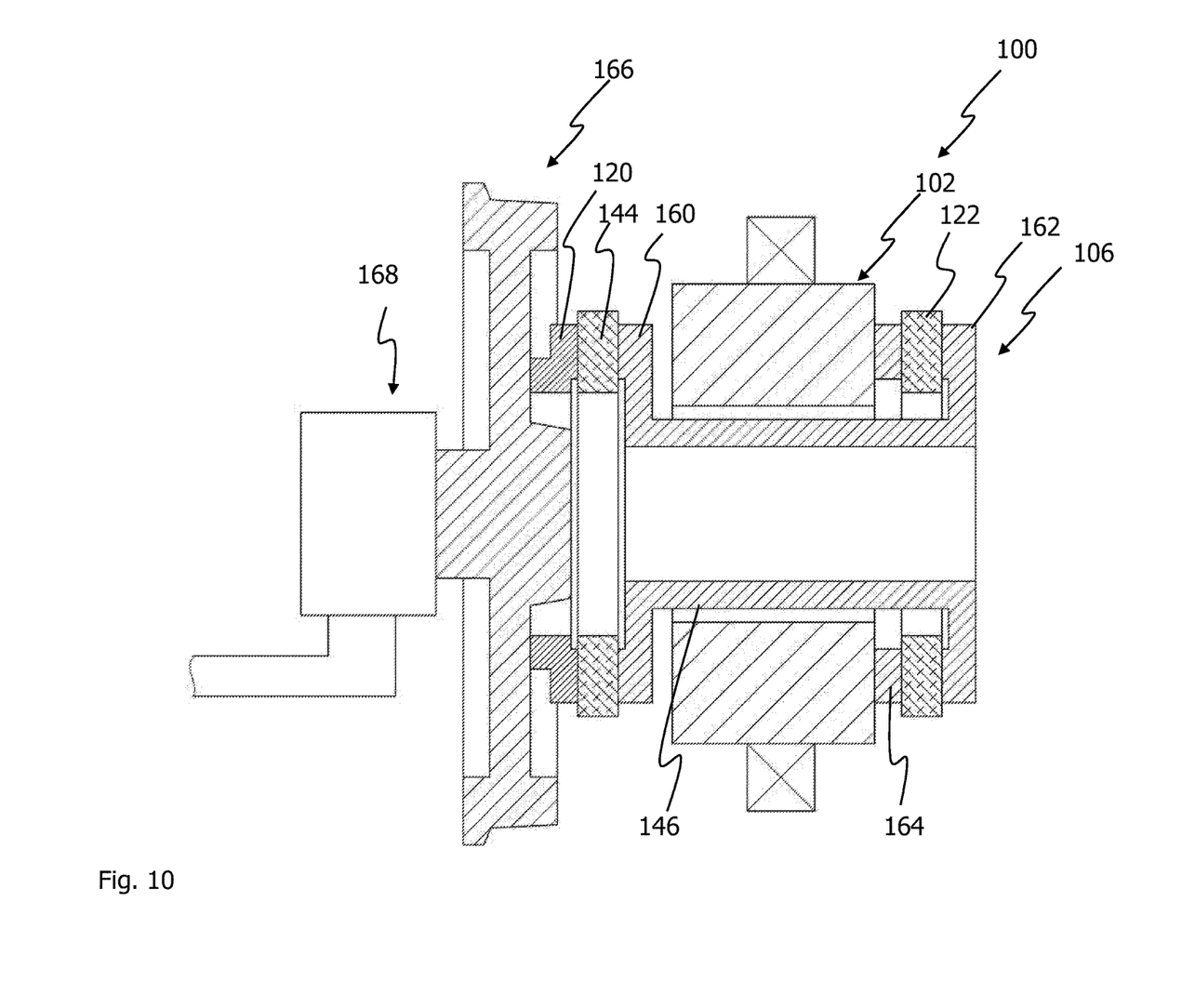
FIG. 10 shows a partial sectional view of a drive assembly according to a sixth embodiment.

FIG. 10 shows a partial sectional view of a drive assembly 100 according to a sixth embodiment of the invention. The drive assembly 100 has the motor 102, which has an opening 116. The intermediate piece 146 of the elastic coupling 106 extends through the opening 116. The intermediate piece 146 has a flange section 160 and 162 at each of its axial ends. Each of the flange sections 160, 162 is connected to an elastic device 122, 144. The elastic device 122 is connected to the motor output element 164. The elastic device 144 is connected by means of the flange 120 to the rail vehicle wheel 166. The elastic devices 122 and 124 are each positioned on a respective axial side of the motor 102. The flange sections 160 and 162 of the intermediate piece 146 are each positioned on a respective axial side of the motor 102. The motor 102, the elastic coupling 106, and the rail vehicle wheel 166 are positioned coaxially.

Figure 11:
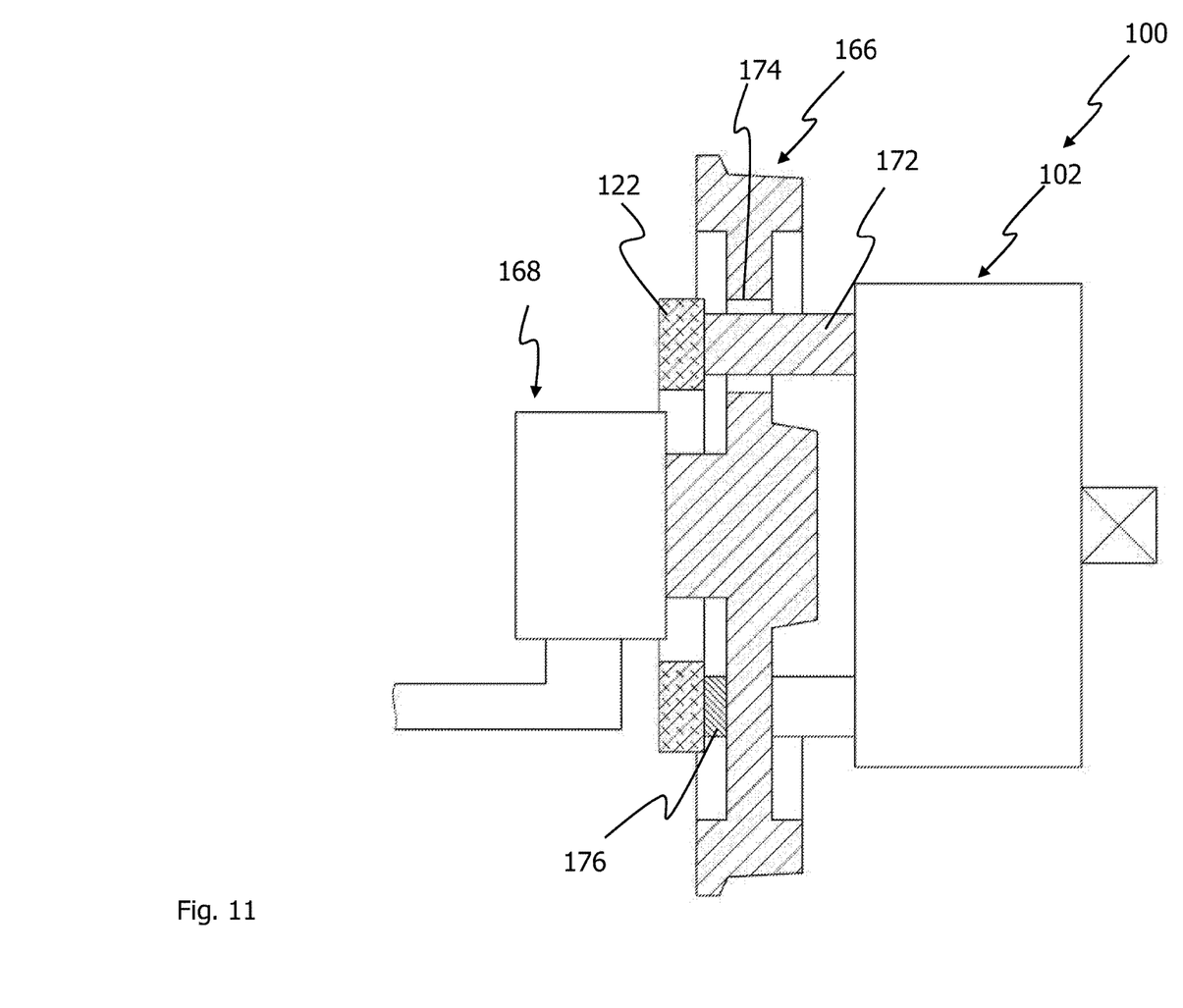
FIG. 11 shows a partial sectional view of a drive assembly according to a seventh embodiment.

FIG. 11 shows a partial sectional view of a drive assembly 100 according to a seventh embodiment. The drive assembly 100 has the motor 102. The motor 102 is connected to the elastic device 122 by means of a connecting element 172. The connecting element 172 extends at least partway through an opening 174 in the rail vehicle wheel 166. The elastic device 122 is connected to the rail vehicle wheel 166 by means of a coupling element 176. The elastic device 122 positioned on the side of the rail vehicle wheel 166 oriented away from the motor 102.

With the drive assembly 100, it is possible to compensate for relative movements between a motor and a wheel set shaft or rail vehicle wheel. The drive assembly constitutes a direct drive for directly driving a wheel set shaft or a rail vehicle wheel. A fiber-reinforced articulating device like the disc joint that is used by way of example in the embodiments described above is maintenance-free, requires little installation space, and generates little or no restoring forces.

The invention claimed is:

1. A drive assembly for a rail vehicle, having:
   at least one motor;
   at least one wheel set shaft or at least one rail vehicle wheel; and
   at least one elastic coupling that has at least one elastic device;
   wherein the at least one elastic coupling is embodied to couple the at least one motor directly to the wheel set shaft or directly to the at least one rail vehicle wheel, wherein the drive assembly is configured as a transmissionless direct drive.

2. The drive assembly according to claim 1, wherein the at least one elastic coupling is coupled to the wheel set shaft and a motor output element of the at least one motor.

3. The drive assembly according to claim 1, wherein the wheel set shaft extends through the motor and the at least one elastic coupling.

4. The drive assembly according to claim 2, wherein the wheel set shaft extends through the motor and the at least one elastic coupling.

5. The drive assembly according to claim 1, wherein the at least one elastic coupling is coupled directly to the at least one rail vehicle wheel and a motor output element of the at least one motor.

6. The drive assembly according to claim 1, wherein the at least one elastic coupling has at least one flange that is coupled directly to the wheel set shaft or the at least one rail vehicle wheel.

7. The drive assembly according to claim 2, wherein the at least one elastic coupling has at least one flange that is coupled directly to the wheel set shaft or the at least one rail vehicle wheel.

8. The drive assembly according to claim 3, wherein the at least one elastic coupling has at least one flange that is coupled directly to the wheel set shaft or the at least one rail vehicle wheel.

9. The drive assembly according to claim 4, wherein the at least one elastic coupling has at least one flange that is coupled directly to the wheel set shaft or the at least one rail vehicle wheel.

10. The drive assembly according to claim 1, wherein the at least one elastic coupling has at least one other flange that is coupled directly to the motor output element.

11. The drive assembly according to claim 1, wherein the at least one elastic device is coupled directly to the at least one motor output element.

12. The drive assembly according to claim 1, wherein the at least one elastic coupling has at least two elastic devices that are connected to each other by means of an intermediate piece.

13. The drive assembly according to claim 12, wherein the at least one intermediate piece extends through the at least one motor.

14. The drive assembly according to claim 1, wherein the at least one elastic coupling has at least one connecting element that extends at least partway through the at least one rail vehicle wheel;
    wherein the at least one connecting element is coupled to the motor; and
    wherein the at least one elastic device is coupled to the at least one rail vehicle wheel.

15. The drive assembly according to claim 1, wherein the at least one elastic device has at least one fiber-reinforced articulating device or at least one elastic coupling wedge packet.

16. The drive assembly according to claim 15, wherein the at least one fiber-reinforced articulating device has at least one elastic disc joint or at least one elastic coupling loop.

17. A wheel set having at least one drive assembly according to claim 1.

18. A bogie having at least one drive assembly according to claim 1.

19. The bogie according to claim 18, wherein the at least one motor is supported on the bogie by at least one support.

20. A rail vehicle, wherein the rail vehicle has at least one selected from the group consisting of:
(1) at least one drive assembly comprising:
at least one motor;
at least one wheel set shaft or at least one rail vehicle wheel; and
at least one elastic coupling that has at least one elastic device;
wherein the at least one elastic coupling is embodied to couple the at least one motor directly to the wheel set shaft or directly to the at least one rail vehicle wheel, and
wherein the drive assembly is configured as a transmissionless direct drive; and
(2) at least one wheel set having at least one drive assembly comprising:
at least one motor;
at least one wheel set shaft or at least one rail vehicle wheel; and
at least one elastic coupling that has at least one elastic device;
wherein the at least one elastic coupling is embodied to couple the at least one motor directly to the wheel set shaft or directly to the at least one rail vehicle wheel, and
wherein the drive assembly is configured as a transmissionless direct drive; and
(3) at least one bogie having at least one drive assembly comprising:
at least one motor;
at least one wheel set shaft or at least one rail vehicle wheel; and
at least one elastic coupling that has at least one elastic device;
wherein the at least one elastic coupling is embodied to couple the at least one motor directly to the wheel set shaft or directly to the at least one rail vehicle wheel, and
wherein the drive assembly is configured as a transmissionless direct drive.

* * * * *